Figure 1:
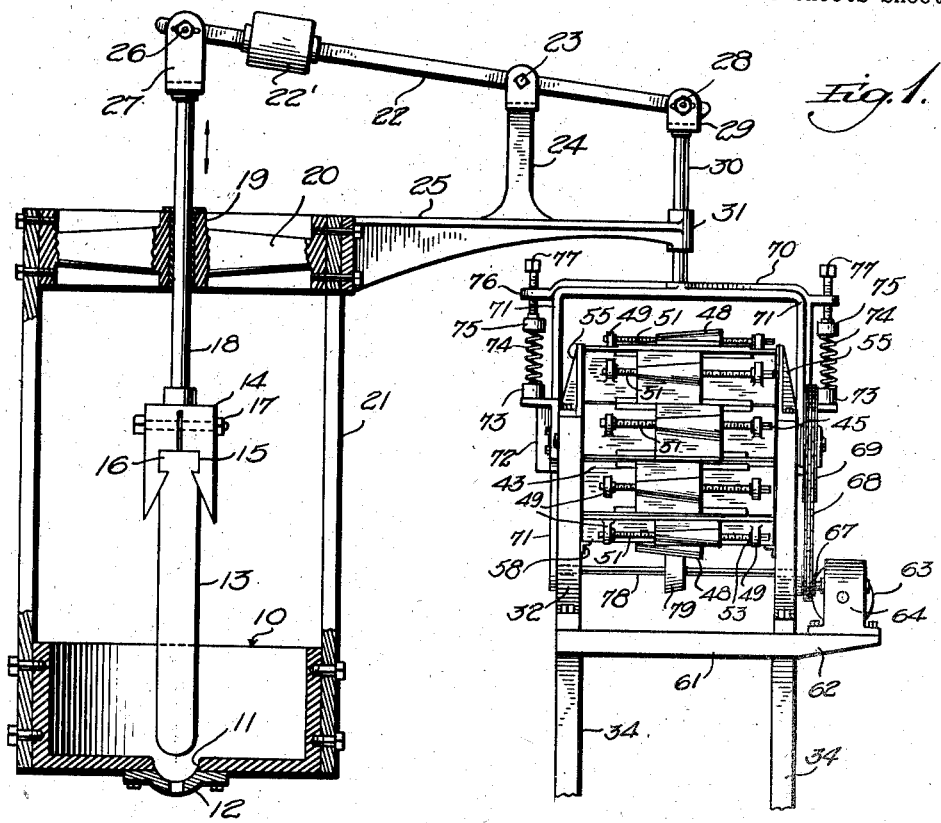

Aug. 19, 1941.  T. H. JEFFERS  2,253,277
GLASS FEEDING DEVICE
Filed Dec. 8, 1939  3 Sheets-Sheet 1

Inventor
THOMAS H. JEFFERS
Attorney

Aug. 19, 1941.  T. H. JEFFERS  2,253,277
GLASS FEEDING DEVICE
Filed Dec. 8, 1939   3 Sheets-Sheet 2
Fig. 3.
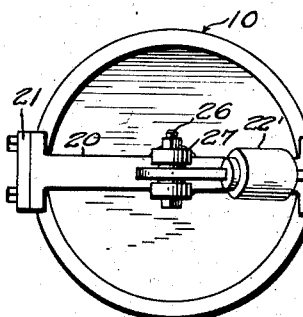
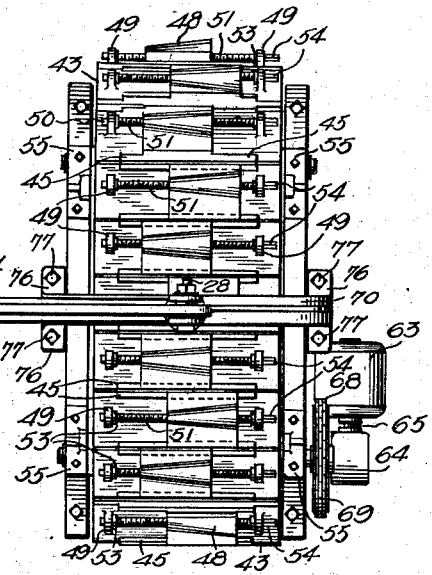
Fig. 4.
Fig. 5.
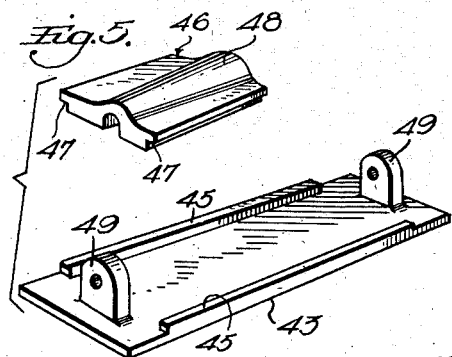
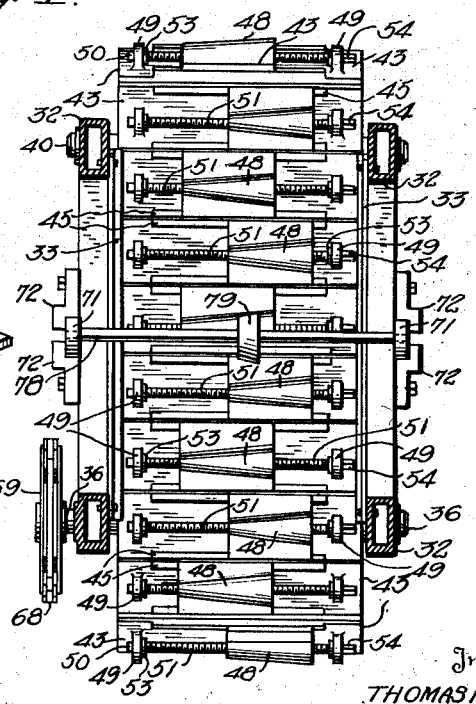
Inventor
THOMAS H. JEFFERS
By C. L. Parker
Attorney Aug. 19, 1941.　　　　T. H. JEFFERS　　　　2,253,277
GLASS FEEDING DEVICE
Filed Dec. 8, 1939　　　3 Sheets-Sheet 3

Inventor
THOMAS H. JEFFERS
By
Attorney

Patented Aug. 19, 1941

2,253,277

UNITED STATES PATENT OFFICE 2,253,277

GLASS FEEDING DEVICE

Thomas H. Jeffers, Paden City, W. Va.

Application December 8, 1939, Serial No. 308,247

8 Claims. (Cl. 49—55)

This invention relates to glass feeding devices.

In the manufacture of molded glass articles it is the common practice to provide a molding apparatus having a plurality of molds successively movable to a position beneath a furnace pot or other receptacle to receive molten glass therefrom whereby the successive articles may be molded. The pot or the like is provided with a reciprocating plunger or "needle" which is mounted to move in a fixed path to effect the discharge of successive gobs of glass of the same size, shearing means being provided for cutting off the gob of glass at the proper point when filling each mold.

Such a mechanism, while wholly practicable in operation, involves a serious disadvantage in that it requires the making of a plurality of identical molds to receive the successive gobs of glass, the molds being quite expensive to manufacture.

An important object of the present invention is to provide a novel glass feeding mechanism for feeding gobs of glass to successive molds movable to a position to receive them, the glass feeding mechanism being of such nature as to feed gobs of glass of different size, if desired.

A further object is to provide such a mechanism wherein each successive reciprocation of the glass feeding plunger may be predetermined, thus permitting any combination of molds of different sizes to be successively filled from the same discharge opening through reciprocation of the same plunger.

A further object is to provide a plurality of cams operative for effecting successive reciprocations of the plunger and to provide means associated with each cam for adjusting the distance of reciprocation of the plunger to predetermine the volume of each gob of glass which will be discharged from the mechanism.

A further object is to provide a plunger reciprocating mechanism having a roller successively engageable with the cams referred to to effect reciprocation of the plunger, and to so shape the cams and mount them with respect to their operating mechanism as to render them adjustable in position independently of each other to permit the size of each successive gob of glass to be predetermined.

A further object is to provide such a mechanism wherein each cam is adjustable during the operation of the apparatus, thus rendering it unnecessary to shut down the apparatus to make the desired adjustments.

Other objects and advantages of the invention will become apparent during the course of the following description.

In the drawings I have shown one embodiment of the invention. In this showing—

Figure 2:
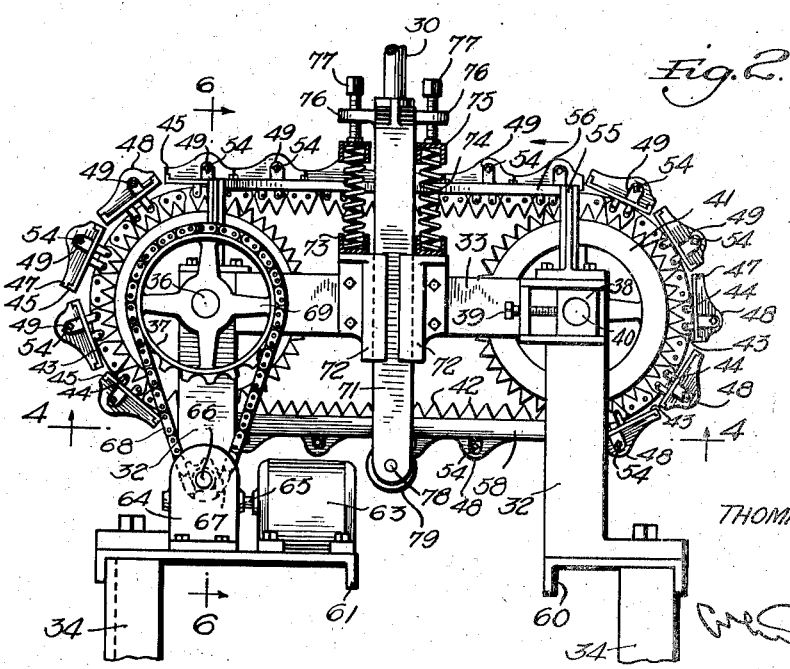
Figure 6:
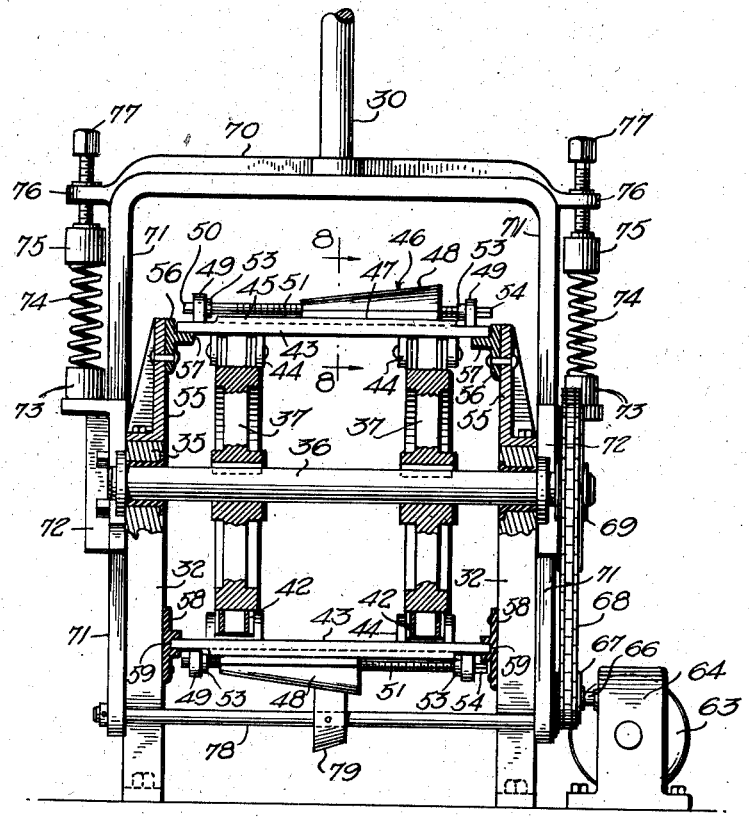
Figure 7:
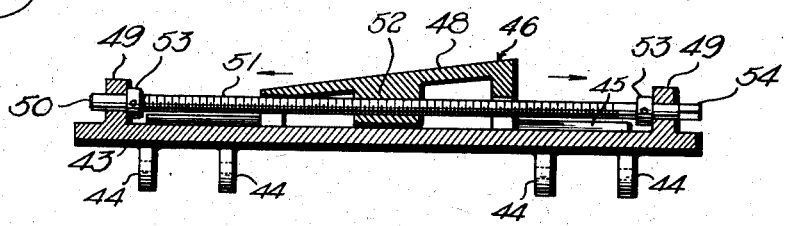
Figure 8:
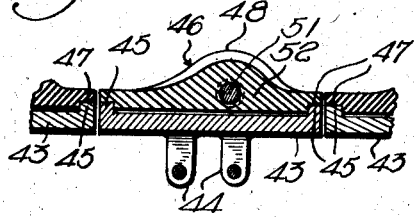

Figure 1 is an elevation of the actuating mechanism shown in conjunction with the furnace pot or the like, the latter being shown in section, Figure 2 is a side elevation of the actuating mechanism, Figure 3 is a plan view, Figure 4 is a horizontal sectional view on line 4—4 of Figure 2 looking upwardly, parts being shown in elevation, Figure 5 is a detail perspective view of one of the cam elements and its associated carrier, the parts being shown separated, Figure 6 is a sectional view on line 6—6 of Figure 2, Figure 7 is an enlarged detail sectional view taken longitudinally through one of the cams and associated elements, and, Figure 8 is a detail sectional view on line 8—8 of Figure 6.

Referring to Figure 1, the numeral 10 designates a furnace pot or similar receptacle from which molten glass is to be fed into the molds. The pot 10 is provided with an orifice 11 below which is arranged a mouth ring 12 through which the gobs of molten glass are adapted to be discharged into successive molds (not shown) movable therebeneath. The molds may be of any conventional type by which successive molds are advanced to a position to receive gobs of glass and any suitable shearing mechanism (not shown) may be employed in conjunction with the mechanism to be described for shearing the glass at the proper point.

A plunger or "needle" 13 is vertically reciprocable to effect the discharge of successive gobs of glass through the mouth ring 12, the size of the gobs of glass depending upon the distance of reciprocation of the plunger. A split head 14 is provided with a recess 15 to receive the upper end 16 of the plunger 13, and the plunger is clamped in position by a suitable bolt 17.

The head 14 is carried by the lower end of a rod 18 reciprocable in a bearing 19 carried by arms 20 secured to the upper ends of supports 21, and the lower ends of these supports may be secured to the pot 10. A walking beam 22 is pivoted intermediate its ends as at 23 on an upright 24 carried by a support 25. The walking beam may be counterbalanced as at 22' for a purpose to be described. The walking beam has a pin and slot connection 26 at one end with a yoke 27 carried by the upper end of the rod 18. The other end of the walking beam has a pin and slot connection 28 with a yoke 29 carried by the upper end of a reciprocating rod 30 and this rod is mounted in a bearing 31 carried by the support 25. The rod 30 is reciprocated by the mechanism to be described. The mechanism for effecting reciprocation of the rod 30 and hence operation of the plunger 13 comprises a pair of posts 32 arranged at each side of the mechanism and the posts of each pair are connected by a rigid longitudinal frame member 33. The legs 32 are supported in any suitable manner as by being secured to the upper ends of suitable supports 34.

The upper end of one leg of each pair 32 at opposite sides of the apparatus is provided with a bearing 35 (Figure 6) and these bearings rotatably support a shaft 36 carrying sprockets 37 within the side frame members of the apparatus. The remaining opposite posts 32 are provided at their upper ends with horizontal slidable bearings 38, adjustable by screws 39, and the bearings 38 support a shaft 40 which carries a pair of sprockets 41. Sprocket chains 42 pass around the sprockets as shown in Figures 2 and 6.

The sprocket chains 42 act as supports for a plurality of carriers 43 (Figures 5, 7 and 8), each of these carriers being provided with pairs of depending ears 44 secured to links of the chains 42 to be moved thereby, each pair of ears 42 being secured to a single link of the chain. Each carrier 43 comprises a preferably flat body portion having upstanding longitudinal edges 45 machined to form guides for a purpose to be described. The carriers 43 of the portions of the chains which are traveling horizontally are arranged in close edge to edge relation as shown in Figure 8.

A cam member 46 is mounted on each carrier and the body of each cam member is undercut at opposite edges as at 47 (Figures 5 and 8) to correspond in shape to the guides 45 to slide therealong to adjusted positions. Each cam member further includes a cam surface 48 tapered or formed as a section of a cone as shown in Figures 5 and 7 for a purpose to be described.

Each carrier 43 is provided adjacent its ends with a pair of upstanding ears 49 rotatably supporting a shaft 50 threaded intermediate its ends as at 51 for reception in an internally threaded boss 52 preferably formed integral with the associated cam member 46. Collars 53 are fixed to the shaft 50 and engage the ears 49 to prevent longitudinal movement of the screw shaft, and this shaft has one end formed polygonally as at 54 for the reception of a wrench whereby it may be rotated. It will become apparent that either while the apparatus is at rest or during its operation, one or more of the screw shafts 50 may be rotated to move the associated cam or cams longitudinally of the screws to vary the relative positions of the cams. This operation is effective for varying the distance of reciprocation of the plunger 13, as will become apparent.

The upper and lower runs of the chains are suitably supported between the sprockets. Referring to Figures 1, 2 and 6, the numeral 55 designates an upstanding bracket carried by each end of each horizontal frame member 33, and these brackets support horizontal guides 56 each of which has an inwardly projecting horizontal flange 57 over which the end portions of the carriers slide in the upper runs of the chains. Accordingly sagging of the chains is prevented in the upper runs thereof.

The power for operating the walking beam 22 is taken from the cams 48 in the lower runs of the chains and accordingly it is desirable to prevent vertical movement of the lower runs of the chains either upwardly or downwardly. For this purpose a guide 58 is arranged adjacent each side of the apparatus and each of these guides extends between two of the vertical frame members 32 and is secured thereto inwardly thereof. Each guide 58 is provided with a horizontal groove 59 to receive the adjacent ends of the carriers 43. Accordingly these carriers are free to move horizontally upon rotation of the sprockets but are fixed against any vertical movement.

Transverse members 60 and 61 extend beneath and are secured to the lower ends of the vertical frame members 32 and the cross member 61 is horizontally extended beyond the frame of the apparatus as at 62 to provide a support for a motor 63 and a reduction gearing 64. The reduction gearing may be of any suitable type and is driven from the shaft 65 of the motor. The reduction gearing is provided with an output shaft 66 carrying a sprocket 67 and a chain 68 passes around this sprocket and around a larger sprocket 69 carried by the shaft 36. The mechanism described provides means for driving the endless chains, as will be apparent.

Power for operating the walking beam 22 is transmitted through a yoke 70 having depending arms 71 each of which operates in a pair of guides 72 carried by one of the horizontal frame members 33. These guides cause the yoke 70 to partake of vertical rectilinear movement and the shaft 30 is connected at its lower end to the yoke 70 whereby it is reciprocated to oscillate the walking beam 22.

Each guide member 72 is provided with a spring seat 73 supporting the lower end of a compression spring 74 and the upper end of each spring is arranged in a cup 75. Each yoke arm 71 is provided near its upper end with opposite projections 76 having adjusting screws 77 threaded therein and engaging the spring cups 75 whereby the tension of the springs 74 may be adjusted.

A transverse shaft 78 is journaled at its ends in the lower ends of the yoke arms 71 and centrally of the width of the apparatus the shaft 78 carries a roller 79 fixed thereto. This roller is preferably tapered to correspond to the taper of the cams 48 as shown in Figures 1 and 6. The springs 74, acting upwardly against the yoke 70, hold the roller 79 in firm engagement with the lower surfaces of the cam elements, as will be apparent.

The operation of the apparatus is as follows:

The pot 10 is supplied with molten glass in the usual manner to be discharged through the mouth ring 12, sheared and dropped into successive molds passing beneath the ring 12. As previously stated, any suitable conventional type of shearing mechanism may be employed and such mechanism has not been illustrated since it forms no part of the present invention. The same is true of the molds, and as previously stated, it has been the common practice to provide a plurality of identical molds having means for successively conveying them to a position beneath the mouth ring 12 to receive a gob of glass therefrom. The molds have been made identical for the reason that in prior machines of this character each gob of glass dropped into each successive mold is exactly the same size. Such arrangement is disadvantageous since it permits articles of only one size to be made with one apparatus, and it involves substantial expense incident to the making of a number of identical molds, these molds being relatively expensive to manufacture.

The principal object of the present invention is to permit the molding with a single apparatus of articles of different sizes and shapes, and this is accomplished by providing means for varying the travel of the plunger 13 and consequently varying the sizes of the gobs of glass. The endless chains are synchronized in their operation with the placing of the molds in charge-receiving position, as will be apparent. As the endless chains are driven, the roller 79 contacts with successive cams and is moved downwardly by each cam. As the roller passes over a cam, it is moved downwardly together with the yoke 70, thus pulling downwardly on the adjacent end of the walking beam 22 and elevating the plunger 13. As the high point of each cam passes from the roller, the springs 74 force the yoke 70 upwardly, thus moving the plunger 13 downwardly to discharge a gob of glass which is sheared and dropped into the mold.

The size of each gob of glass will depend upon the distance of reciprocation of the plunger 13 and such distance, in turn, depends upon the distance the plunger 13 has been moved upwardly by the associated cam member. These cam members being adjustable, it will be apparent that any desired variation in the sizes of the gobs of glass may be obtained, within reasonable limits as will be understood.

The height to which the plunger 13 will be moved by the successive cams depends upon the adjusted position of the latter. Each cam has screw threaded engagement with its associated shaft 50 and a wrench may be applied to the polygonal end 54 of each shaft to adjust the associated cam transversely of the apparatus. Since the roller 79 is fixed against similar movement the reciprocatory movement imparted to the yoke 70 may be readily adjusted.

It will be apparent that the endless chains are driven relatively slowly, and accordingly an attendant may place a wrench over any of the polygonal shaft ends 54 to adjust any of the cam elements 48 while the machine is operating. Each cam element is flat at its edges and the edge portions of all of the cams in the lower runs of the chains are in a common horizontal plane, and accordingly the downward movement of the plunger 13 is arrested at the same point when passing over each of the cams. Each high point of the movement of the plunger 13 is determined by the adjustment of the successive cams, thus predetermining the size of each gob of glass.

All of the carriers 43 are identical, and the same is true of the cam members. These members have sliding engagement with the guides 45, thus effectively preventing any rocking movement of the cams. Each cam element, when assembled with respect to its carrier 43, merely is moved downwardly to engage the grooves 47 with the guides 45, between the ears 49, and with the elements thus assembled, the screw shafts 50 may be inserted in position. The assembled carrier and cam is then ready to be secured to the chains by the ears 44. The machine readily may be designed to provide any desired minimum and maximum distance of reciprocation of the plunger 17, as will be apparent. The walking beam 22 may be counterbalanced as at 22' to assist the springs 74 in moving the plunger 13 downwardly, although such counterbalancing means need not be employed.

It is to be understood that the form of the invention herewith shown and described is to be taken as a preferred example of the same and that various changes in the shape, size and arrangement of parts may be resorted to without departing from the spirit of the invention or the scope of the subjoined claims.

I claim:

1. In a glass feeding mechanism, a container for molten glass having a discharge orifice, a plunger mounted for reciprocation in said container to effect the discharge of glass through said orifice, and means for effecting reciprocation of said plunger comprising an endless chain mechanism, a plurality of cams connected to move with said endless chain mechanism and tapered to vary in size transversely of the direction of movement of said chain mechanism, and motion transmitting means connected to said plunger and having a member successively engageable with said cams to effect reciprocation of said plunger, at least one of said cams being constructed and arranged with respect to said chain mechanism to be moved transversely of the direction of travel thereof to vary the distance of reciprocation of said plunger.

2. In a glass feeding mechanism, a container for molten glass having a discharge orifice, a plunger mounted for reciprocation in said container to effect the discharge of glass through said orifice, and means for effecting reciprocation of said plunger comprising an endless chain mechanism, a plurality of carriers connected to said chain mechanism and provided with guides extending transversely thereof, a cam engaging the guides of each carrier for sliding movement transversely of said chain mechanism, means for holding each cam in a fixed position with respect to the guides of its carrier, each cam being tapered transversely of the direction of movement of said chain mechanism, and motion transmitting means connected to said plunger and including a roller successively engageable with said cams.

3. In a glass feeding mechanism, a container for molten glass having a discharge orifice, a plunger mounted for reciprocation in said container to effect the discharge of glass through said orifice, and means for effecting reciprocation of said plunger comprising an endless chain mechanism, a plurality of carriers connected to said chain mechanism and provided with guides extending transversely thereof, a cam engaging the guides of each carrier for sliding movement transversely of said chain mechanism, a screw rotatably supported by each of said carriers and extending transversely of the direction of movement of said chain mechanism and having threaded engagement with the associated cam whereby rotation of said screw will move said cam along the guides of the associated carrier, each cam being tapered transversely of the direction of movement of said chain mechanism, and motion transmitting means connected to said plunger and including a roller successively engageable with said cams.

4. In a glass feeding mechanism, a container for molten glass having a discharge orifice, a plunger mounted for reciprocation in said container to effect the discharge of glass through said orifice, and means for effecting reciprocation of said plunger comprising motion transmitting means connected to said plunger, a plurality of actuating cams movable in a given direction, said motion transmitting means having a member successively engageable with said cams, each cam being elongated and tapered perpendicular to said given direction, and means connected to each of said cams for moving it perpendicular to said given direction to adjusted positions to predetermine the distance of reciprocation of said plunger upon engagement of said member of said motion transmitting means with each successive cam.

5. In a glass feeding mechanism, a container for molten glass having a discharge orifice, a plunger mounted for reciprocation in said container to effect the discharge of glass through said orifice, and means for effecting the reciprocation of said plunger comprising a walking beam pivotally supported intermediate its ends and connected at one end to said plunger, a reciprocating unit connected to the other end of said walking beam, guides for supporting said reciprocating unit, a roller carried by said reciprocating unit, a plurality of cams, a carrier for each cam, and an endless chain mechanism to which said carriers are connected, said roller being arranged in the path of travel of said cams to be successively engaged thereby to rock said walking beam and reciprocate said plunger, said cams being tapered transversely of said chain mechanism and being connected to said carriers and adjustable thereon transversely of said chain mechanism.

6. In a glass feeding mechanism, a container for molten glass having a discharge orifice, a plunger mounted for reciprocation in said container to effect the discharge of glass through said orifice, and means for effecting the reciprocation of said plunger comprising a walking beam pivotally supported intermediate its ends and connected at one end to said plunger, a reciprocating unit connected to the other end of said walking beam, guides for supporting said reciprocating unit, a roller carried by said reciprocating unit, a plurality of cams, a carrier for each cam, an endless chain mechanism to which said carriers are connected, said roller being arranged in the path of travel of said cams to be successively engaged thereby to rock said walking beam and reciprocate said plunger, said cams being tapered transversely of the direction of movement of said chain mechanism, guide means between each carrier and its cam to support the latter for sliding movement transversely of said chain mechanism, and screw means for adjusting each cam along its guide means.

7. In a glass feeding mechanism, a container for molten glass having a discharge orifice, a plunger mounted for reciprocation in said container to effect the discharge of glass through said orifice, and means for effecting reciprocation of said plunger comprising a lever device connected at one end to said plunger, a reciprocating unit connected to the other end of said lever device, a roller carried by said reciprocating unit, a plurality of cams, means for moving said cams in a predetermined direction successively past and into engagement with said roller, said cams being tapered in a direction perpendicular to their direction of movement past said roller, and means for adjusting the positions of said cams perpendicular to said direction of movement to vary the movement transmitted to said reciprocating unit.

8. In a glass feeding mechanism, a container for molten glass having a discharge orifice, a plunger mounted for reciprocation in said container to effect the discharge of glass through said orifice, and means for effecting reciprocation of said plunger comprising a supporting structure, means for moving said supporting structure in a given plane, a plurality of cams carried by said supporting structure, motion transmitting means connected to said plunger and having a portion constructed and arranged to be engaged by successive cams upon movement of said supporting structure in said plane to effect reciprocating movement of said plunger, each cam being tapered transversely of the plane of movement of said supporting structure, and means for individually moving said cams perpendicular to said plane to adjust the reciprocating movement transmitted to said plunger by successive cams.

THOMAS H. JEFFERS.